US012608444B2

(12) United States Patent
Cheng et al.

(10) Patent No.: US 12,608,444 B2
(45) Date of Patent: Apr. 21, 2026

(54) AUTOMATED SELECTION OF PRINCIPAL COMPONENT ANALYSIS VARIANTS FOR LARGE-SCALE DATASETS

(71) Applicant: Google LLC, Mountain View, CA (US)

(72) Inventors: Xi Cheng, Kirkland, WA (US); Mingge Deng, Kirkland, WA (US); Amir Hossein Hormati, Seattle, WA (US)

(73) Assignee: Google LLC, Mountain View, CA (US)

( * ) Notice: Subject to any disclaimer, the term of this patent is extended or adjusted under 35 U.S.C. 154(b) by 771 days.

(21) Appl. No.: 17/816,288

(22) Filed: Jul. 29, 2022

(65) Prior Publication Data

US 2023/0045139 A1      Feb. 9, 2023

Related U.S. Application Data

(60) Provisional application No. 63/203,934, filed on Aug. 4, 2021.

(51) Int. Cl.
*G06F 18/2135* (2023.01)
*G06F 16/242* (2019.01)
(Continued)

(52) U.S. Cl.
CPC ...... G06F 18/2135 (2023.01); G06F 16/2433 (2019.01); G06N 20/00 (2019.01); *G05B 23/024* (2013.01); *G06F 16/7343* (2019.01); *G06N 7/00* (2013.01); *G06V 10/77* (2022.01); *H04L 41/024* (2013.01)

(58) Field of Classification Search
CPC ............. G06F 18/2135; G06F 16/2433; G06F 16/7343; G06N 20/00; G06N 7/00; G06V 10/77; G05B 23/024; H04L 41/024
See application file for complete search history.

(56) References Cited

U.S. PATENT DOCUMENTS

2004/0260682 A1* 12/2004 Herley .................... G06F 18/00
2015/0186775 A1     7/2015 Cruz Mota et al.
(Continued)

FOREIGN PATENT DOCUMENTS

WO     WO-2022198680 A1 * 9/2022 ........... G05B 23/024

OTHER PUBLICATIONS

Inelus, Gabriel-Robert "Quadratically Regularised Principal Component Analysis over Multi-Relational Databases" Jul. 5, 2019, pp. i-82. (Year: 2019).*

(Continued)

*Primary Examiner* — Miranda M Huang
*Assistant Examiner* — Chase P. Hinckley
(74) *Attorney, Agent, or Firm* — Shumaker & Sieffert, P.A.

(57) ABSTRACT

A method for principal component analysis includes receiving a principal component analysis (PCA) request from a user requesting data processing hardware to perform PCA on a dataset, the dataset including a plurality of input features. The method further includes training a PCA model on the plurality of input features of the dataset. The method includes determining, using the trained PCA model, one or more principal components of the dataset. The method also includes generating, based on the plurality of input features and the one or more principal components, one or more embedded features of the dataset. The method includes returning the one or more embedded features to the user.

14 Claims, 9 Drawing Sheets

(51) Int. Cl.

| | |
|---|---|
| *G06N 20/00* | (2019.01) |
| *G05B 23/02* | (2006.01) |
| *G06F 16/732* | (2019.01) |
| *G06N 7/00* | (2023.01) |
| *G06V 10/77* | (2022.01) |
| *H04L 41/02* | (2022.01) |

(56) References Cited

U.S. PATENT DOCUMENTS

| | | | | |
|---|---|---|---|---|
| 2019/0311552 | A1* | 10/2019 | Zhang | G06N 20/00 |
| 2020/0034740 | A1 | 1/2020 | Yang et al. | |
| 2020/0381084 | A1* | 12/2020 | Kawas | G06F 18/2135 |
| 2020/0402660 | A1* | 12/2020 | Chakravarthy | G16H 50/50 |
| 2021/0174207 | A1* | 6/2021 | Parker | G06F 16/2228 |
| 2021/0264201 | A1* | 8/2021 | Pandey | G06V 10/7715 |
| 2021/0374553 | A1* | 12/2021 | Li | G06N 3/088 |
| 2022/0374765 | A1* | 11/2022 | Wu | G06F 16/24578 |
| 2022/0394629 | A1* | 12/2022 | Lau | H04W 52/16 |
| 2024/0086745 | A1* | 3/2024 | Gemp | G06N 3/006 |
| 2025/0086652 | A1* | 3/2025 | Wang | G05B 23/024 |

OTHER PUBLICATIONS

Erichson et al., "Randomized Matrix Decomposition Using R" Nov. 26, 2019, arXiv: 1608.02148v5, pp. i-47. (Year: 2019).*

Sharma et al., "Principal component analysis using QR decomposition" Sep. 25, 2012, pp. 679-683. (Year: 2012).*

Rolinek et al., "Variational Autoencoders Pursue PCA Directions (by Accident)" Apr. 16, 2019, arXiv: 1812.06775v2, pp. 1-19. (Year: 2019).*

Dou et al., "PCA-SRGAN: Incremental Orthogonal Projection Discrimination for Face Super-resolution" Aug. 28, 2020, arXiv: 2005.00306v2, pp. 1-8. (Year: 2020).*

He et al., "EigenGAN: Layer-wise Eigen-Learning for GANs" Apr. 26, 2021, arXiv: 2104.12476v1, pp. 1-35. (Year: 2021).*

Balcan et al., "Communication Efficient Distributed Kernel Principal Component Analysis" Aug. 2016, pp. 725-734. (Year: 2016).*

Ballabio et al., "A MATLAB toolbox for Principal Component Analysis and unsupervised exploration of data structure" Oct. 19, 2015, pp. 1-9. (Year: 2015).*

Fan et al., "Distributed estimation of principal eigenspaces" Jan. 10, 2018, arXiv: 1702.06488v4, pp. 1-47. (Year: 2018).*

Ghojogh et Crowley, "Unsupervised and Supervised Principal Component Analysis: Tutorial" Jun. 1, 2019, arXiv: 1906.03148v1, pp. 1-25. (Year: 2019).*

Golinko et Zhu, "Generalized Feature Embedding for Supervised, Unsupervised, and Online Learning Tasks" Apr. 16, 2018, pp. 125-142. (Year: 2018).*

Hertrich et al., "PCA Reduced Gaussian Mixture Models with Applications in Superresolution" May 6, 2021, arXiv: 2009. 07520v3, pp. 1-31. (Year: 2021).*

Wu et al., "A Review of Distributed Algorithms for Principal Component Analysis" 2018, pp. 1-19. (Year: 2018).*

International Search Report and Written Opinion for the related Application No. PCT/US2022/074341 dated Nov. 24, 2022, 231 pages.

Benjamin Erichson N et al: "Randomized Matrix Decompositions using R", arxj:v. org, Cornell University Library, 201 Olin Library Cornell University Ithaca, NY 14853, Aug. 6, 2016 (Aug. 6, 2016), XP081560626 , DOI: 10.18637/JSS.V089. 111, 47 pages.

Zhang Yiqun et al: "Big Data Analytics, Integrating a Parallel Columnar DBMS and the R. Language", 2016 16th IEEE/ACM International Symposium on Cluster, Cloud and Grid Computing CCGRID), IEEE, May 16, 2016 (May 16, 2016), pp. 627-630, XP032927099, DOI: 10.1109/CCGRID.2016.94, retrieved on Jul. 18, 2016, 6 pages.

Nathan Halko et al: "An algorithm for the principal component analysis of large data sets," arxiv.org, Cornell University Library, 201, Olin Library Cornell University Ithaca, NY 14853, Jul. 30, 2010 (Jul. 30, 2010), XP080491162, DOI: 10.1137/100804139, 48 pages.

Elgamal Tarek Tgamal@QF ORG QA et al: "sPCA Scalable Principal Component Analysis for Big Data on Distributed Platforms", Proceedings of the 27th Annual International Conference on Mobile Computing and Networking, ACM, New York, NY, USA, May 27, 2015 (May 27, 2015), pp. 79-91, XP058752025, DOI: 10.1145/ 2723372 2751520 ISBN: 978-1-4503-8342-4, 13 pages.

Andreas Grammenos et al: "Federated Principal Component Analysis", arxiv.org, Cornell University Library, 201 Olin Library Cornell University Ithaca, NY 14853, Oct. 22, 2020 (Oct. 22, 2020), XP081795533, 36 pages.

Boutsidis@gmail com et al: "Optimal principal component analysis in distributed and streaming models", Theory of Computing, ACM, 2 Penn Plaza, Sute 701 New York NY 10121-0701 USA, Jun. 19, 2016 (Jun. 19, 2016), pp. 236-249, XP058696210, DOI: 10.1145/ 2897518.2897646 ISBN: 978-1-4503-4132-5, 14 pages.

"PCA", scikit-learn 1.7.1 documentation, 11 pp., Retrieved from the Internet on Jul. 18, 2025 from URL: https://scikit-learn.org/stable/ modules/generated/sklearn.decomposition.PCA.html.

"PCA: Principal Component Analysis (PCA)", RDocumentation, 4 pp., Retrieved from the Internet on Jul. 18, 2025 from URL: https://www.rdocumentation.org/packages/FactoMineR/versions/2. 4/topics/PCA.

Response to Communication Pursuant to Rules 161(1) and 162 EPC dated Mar. 13, 2024, from counterpart European Application No. 22761867.5, filed Sep. 12, 2024, 18 pp.

First Examination Report from counterpart Indian Application No. 202447013919 dated Oct. 14, 2025, 11 pp.

Communication pursuant to Article 94(3) EPC from counterpart European Application No. 22761867.5 dated Jan. 22, 2026, 9 pp.

Response to First Examination Report dated Oct. 14, 2025 from IN Application No. 202447013919, filed Jan. 30, 2026, 16 pp.

\* cited by examiner

300a

Basic PCA Algorithm

1) Compute the covariance matrix of the input data $X$ via $$K_{XX} = cov[X, X] = E((X - \mu_X)(X - \mu_X)^T) = E[XX^T] - \mu_X\mu_X^T$$

2) Compute eigenvectors and corresponding eigenvalues via eigen decomposition.

3) Choose k eigenvectors with the largest eigenvalues to form a projection matrix $W$.

4) Transform the data $X$ to the new space spanned by the chosen eigenvectors via $Y = W^T X$.

FIG. 3A

─ 300b rPCA Algorithm

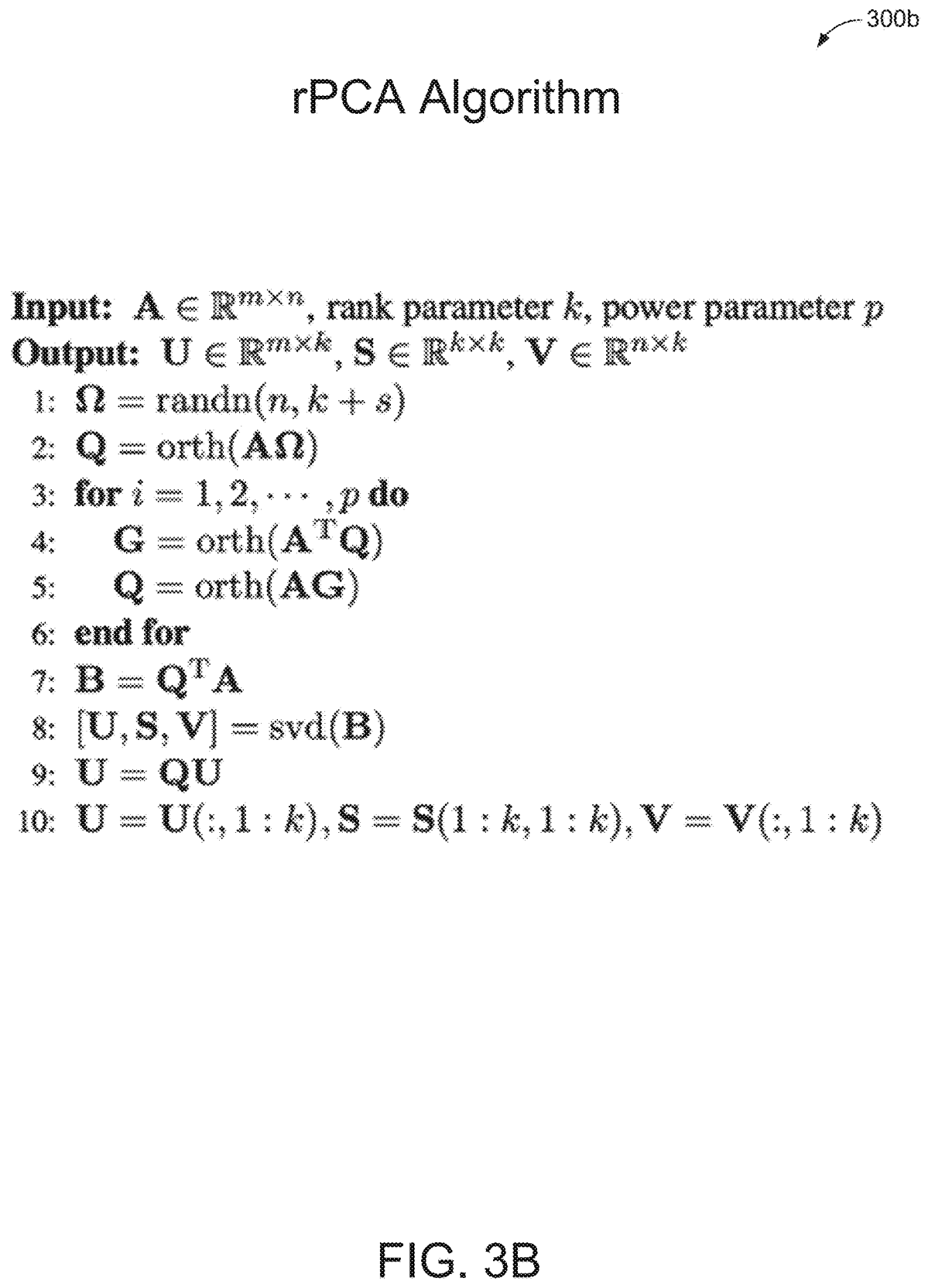

Input: $\mathbf{A} \in \mathbb{R}^{m \times n}$, rank parameter $k$, power parameter $p$

Output: $\mathbf{U} \in \mathbb{R}^{m \times k}$, $\mathbf{S} \in \mathbb{R}^{k \times k}$, $\mathbf{V} \in \mathbb{R}^{n \times k}$ 1: $\Omega = \mathrm{randn}(n, k + s)$
2: $\mathbf{Q} = \mathrm{orth}(\mathbf{A}\Omega)$
3: for $i = 1, 2, \cdots, p$ do
4:     $\mathbf{G} = \mathrm{orth}(\mathbf{A}^{\mathrm{T}}\mathbf{Q})$
5:     $\mathbf{Q} = \mathrm{orth}(\mathbf{A}\mathbf{G})$
6: end for
7: $\mathbf{B} = \mathbf{Q}^{\mathrm{T}}\mathbf{A}$
8: $[\mathbf{U}, \mathbf{S}, \mathbf{V}] = \mathrm{svd}(\mathbf{B})$
9: $\mathbf{U} = \mathbf{Q}\mathbf{U}$
10: $\mathbf{U} = \mathbf{U}(:, 1 : k), \mathbf{S} = \mathbf{S}(1 : k, 1 : k), \mathbf{V} = \mathbf{V}(:, 1 : k)$

FIG. 3B

300c rPCAt Algorithm

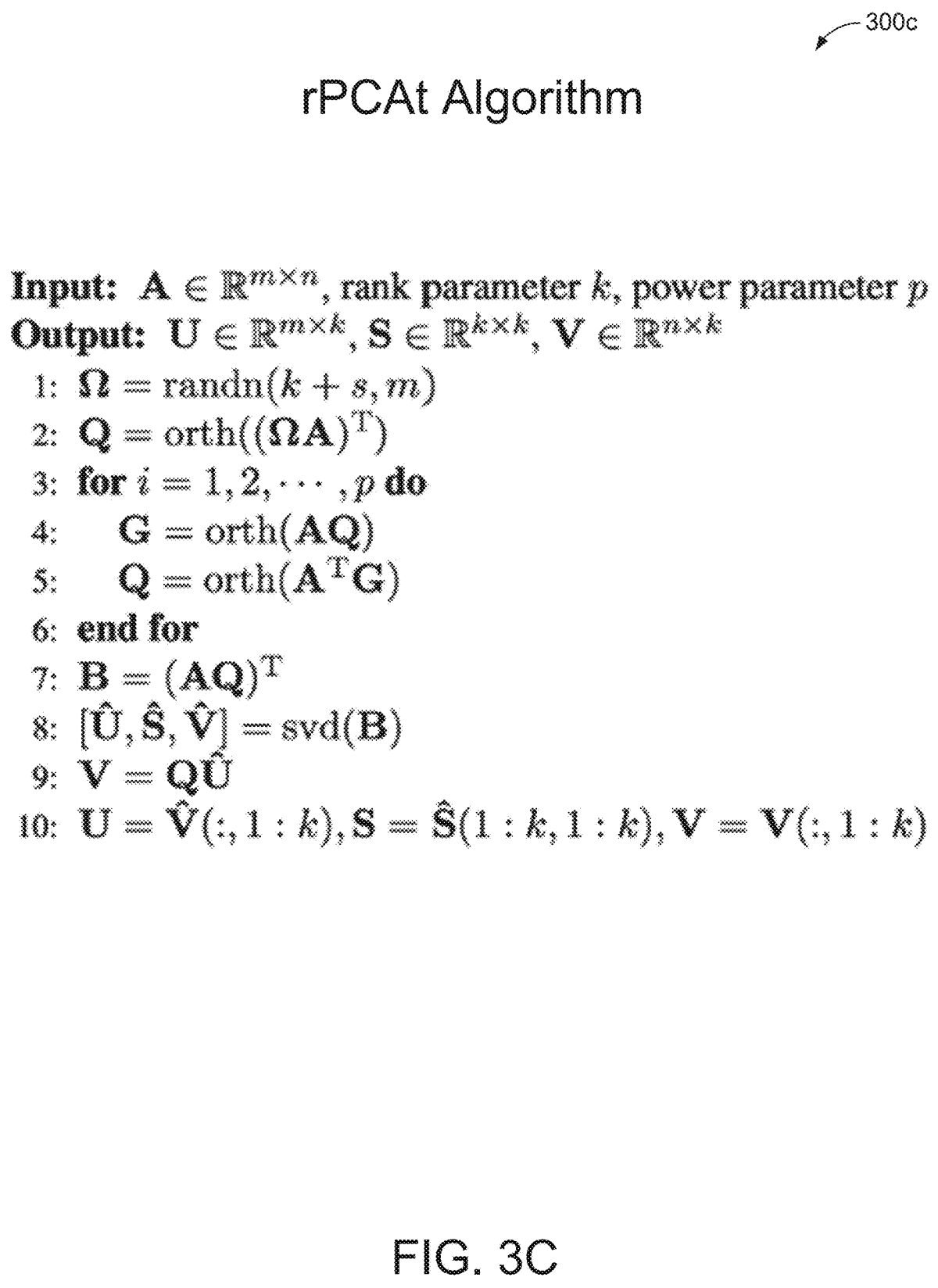

Input: $\mathbf{A} \in \mathbb{R}^{m \times n}$, rank parameter $k$, power parameter $p$

Output: $\mathbf{U} \in \mathbb{R}^{m \times k}, \mathbf{S} \in \mathbb{R}^{k \times k}, \mathbf{V} \in \mathbb{R}^{n \times k}$ 1: $\Omega = \operatorname{randn}(k + s, m)$ 2: $\mathbf{Q} = \operatorname{orth}((\Omega \mathbf{A})^{\mathrm{T}})$ 3: for $i = 1, 2, \cdots, p$ do

4:     $\mathbf{G} = \operatorname{orth}(\mathbf{A}\mathbf{Q})$

5:     $\mathbf{Q} = \operatorname{orth}(\mathbf{A}^{\mathrm{T}}\mathbf{G})$

6: end for

7: $\mathbf{B} = (\mathbf{A}\mathbf{Q})^{\mathrm{T}}$

8: $[\hat{\mathbf{U}}, \hat{\mathbf{S}}, \hat{\mathbf{V}}] = \operatorname{svd}(\mathbf{B})$ 9: $\mathbf{V} = \mathbf{Q}\hat{\mathbf{U}}$ 10: $\mathbf{U} = \hat{\mathbf{V}}(:, 1:k), \mathbf{S} = \hat{\mathbf{S}}(1:k, 1:k), \mathbf{V} = \mathbf{V}(:, 1:k)$

FIG. 3C

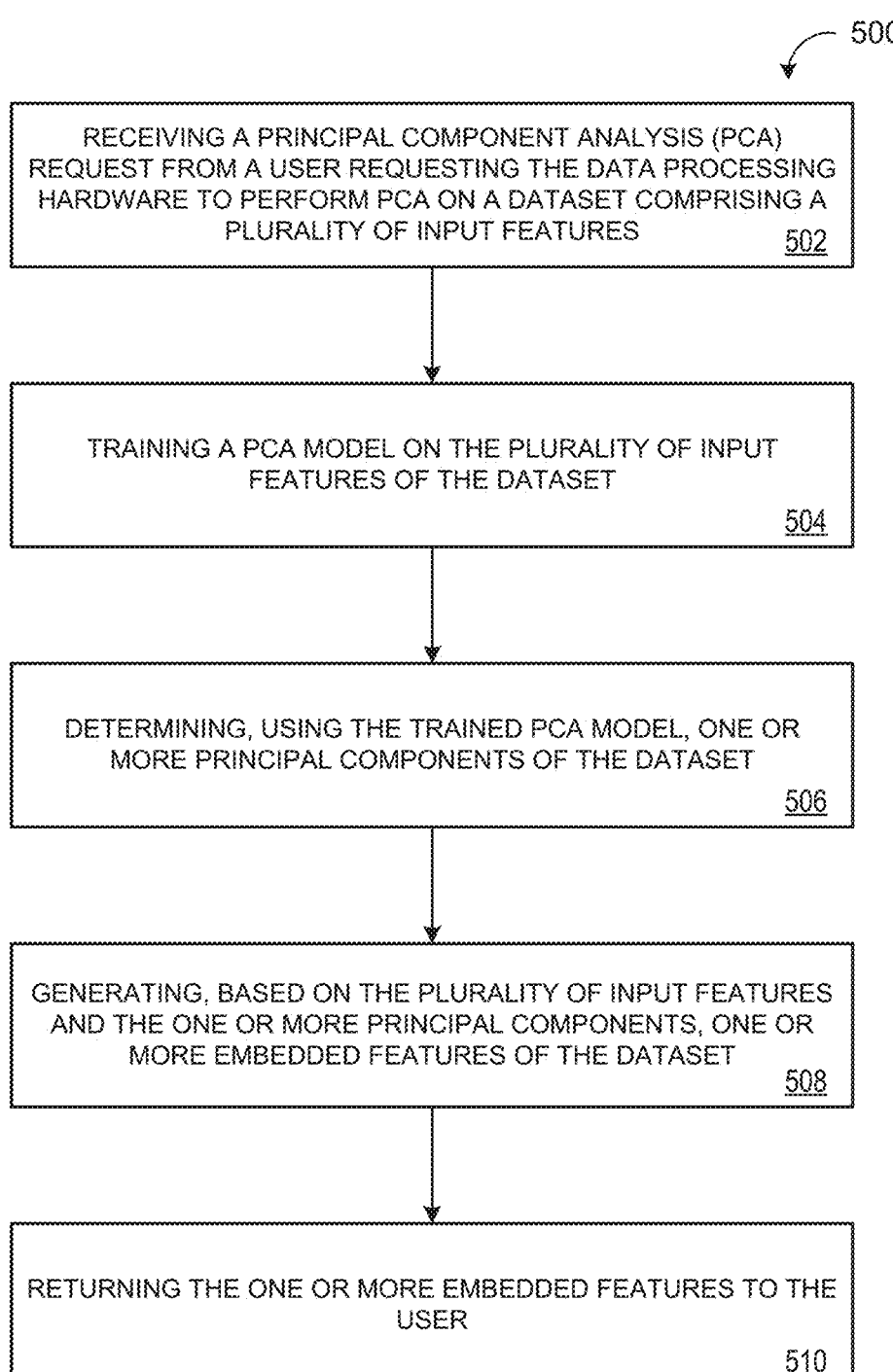

500

RECEIVING A PRINCIPAL COMPONENT ANALYSIS (PCA) REQUEST FROM A USER REQUESTING THE DATA PROCESSING HARDWARE TO PERFORM PCA ON A DATASET COMPRISING A PLURALITY OF INPUT FEATURES     502

TRAINING A PCA MODEL ON THE PLURALITY OF INPUT FEATURES OF THE DATASET     504

DETERMINING, USING THE TRAINED PCA MODEL, ONE OR MORE PRINCIPAL COMPONENTS OF THE DATASET     506

GENERATING, BASED ON THE PLURALITY OF INPUT FEATURES AND THE ONE OR MORE PRINCIPAL COMPONENTS, ONE OR MORE EMBEDDED FEATURES OF THE DATASET     508

RETURNING THE ONE OR MORE EMBEDDED FEATURES TO THE USER     510

FIG. 5

AUTOMATED SELECTION OF PRINCIPAL COMPONENT ANALYSIS VARIANTS FOR LARGE-SCALE DATASETS

CROSS REFERENCE TO RELATED APPLICATIONS

This U.S. patent application claims priority under 35 U.S.C. § 119(e) to U.S. Provisional Application 63/203,934, filed on Aug. 4, 2021. The disclosure of this prior application is considered part of the disclosure of this application and is hereby incorporated by reference in its entirety.

TECHNICAL FIELD

This disclosure relates to principal component analysis.

BACKGROUND

In supervised learning tasks, it is a common misconception that regression or classification results are always improved with an increase in features based on distinguishable characteristics of the input data. However, this is frequently not the case. As the number of features or dimensions grow, the amount of data necessary to accurately generalize the data increases exponentially. Often, when a new feature is added to a model, there is not enough additional data to maintain previous relationships and the new feature may fail to have a positive impact on the supervised learning model. This is colloquially known as the Curse of Dimensionality. Because of this, it is common to reduce the dimensionality of training data using, for example, projection or manifold learning.

SUMMARY

One aspect of the disclosure provides a method for principal component analysis. The method is executed by data processing hardware that causes the data processing hardware to perform operations that include receiving a principal component analysis (PCA) request from a user requesting the data processing hardware to perform PCA on a dataset, the dataset including a plurality of input features. The operations further include training a PCA model on the plurality of input features of the dataset. The operations include determining, using the trained PCA model, one or more principal components of the dataset. The operations include generating, based on the plurality of input features and the one or more principal components, one or more embedded features of the dataset. The operations also include returning the one or more embedded features to the user.

Implementations of the disclosure may include one or more of the following optional features. In some implementations, a number of the one or more embedded features of the dataset is less than a number of the plurality of input features of the data set. In other implementations, training the PCA model includes selecting a PCA variant from among a plurality of PCA variants and training the PCA model on the plurality of input features of the dataset based on the selected PCA variant. In these implementations, selecting the PCA variant may include receiving a selection indication from the user and selecting the PCA variant based on the selection indication. Alternatively in these implementations, selecting the PCA variant may include determining that a number of the plurality of input features satisfies a threshold amount and selecting a basic PCA variant based on determining that the number of the plurality of input features satisfies the threshold amount. In some of these implementations, selecting the PCA variant includes determining that a number of the plurality of input features fails to satisfy a threshold amount and selecting a randomized PCA variant based on determining that the number of the plurality of input features fails to satisfy the threshold amount. In these implementations, the first PCA variant may include a basic PCA algorithm and the second PCA variant may include a randomized PCA algorithm. Alternatively in these implementations, the threshold amount may be based on a memory capacity of a single server that implements the data processing hardware.

The PCA request may include a single Structured Query Language (SQL) query. In some implementations, the PCA model includes a randomized PCA model. In these implementations, the randomized PCA model may include a transposed randomized PCA model. Determining, using the trained PCA model, the one or more principal components of the dataset may include using an economy sized QR decomposition algorithm. Alternatively, determining, using the trained PCA model, the one or more principal components of the dataset may include using a quadratic programming with non-decreasing constraints algorithm.

Another aspect of the disclosure provides a system for principal component analysis. The system includes data processing hardware and memory hardware in communication with the data processing hardware. The memory hardware stores instructions that when executed on the data processing hardware cause the data processing hardware to perform operations. The operations include receiving a principal component analysis (PCA) request from a user requesting the data processing hardware to perform PCA on a dataset, the dataset including a plurality of input features. The operations further include training a PCA model on the plurality of input features of the dataset. The operations include determining, using the trained PCA model, one or more principal components of the dataset. The operations include generating, based on the plurality of input features and the one or more principal components, one or more embedded features of the dataset. The operations also include returning the one or more embedded features to the user.

This aspect may include one or more of the following optional features. In some implementations, a number of the one or more embedded features of the dataset is less than a number of the plurality of input features of the data set. In other implementations, training the PCA model includes selecting a PCA variant from among a plurality of PCA variants and training the PCA model on the plurality of input features of the dataset based on the selected PCA variant. In these implementations, selecting the PCA variant may include receiving a selection indication from the user and selecting the PCA variant based on the selection indication. Alternatively in these implementations, selecting the PCA variant may include determining that a number of the plurality of input features satisfies a threshold amount and selecting a basic PCA variant based on determining that the number of the plurality of input features satisfies the threshold amount. In some of these implementations, selecting the PCA variant includes determining that a number of the plurality of input features fails to satisfy a threshold amount and selecting a randomized PCA variant based on determining that the number of the plurality of input features fails to satisfy the threshold amount. In these implementations, the first PCA variant may include a basic PCA algorithm and the second PCA variant may include a randomized PCA algorithm. Alternatively in these implementations, the threshold amount may be based on a memory capacity of a single server that implements the data processing hardware.

The PCA request may include a single Structured Query Language (SQL) query. In some implementations, the PCA model includes a randomized PCA model. In these implementations, the randomized PCA model may include a transposed randomized PCA model. Determining, using the trained PCA model, the one or more principal components of the dataset may include using an economy sized QR decomposition algorithm. Alternatively, determining, using the trained PCA model, the one or more principal components of the dataset may include using a quadratic programming with non-decreasing constraints algorithm The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3C are schematic views of principal component analysis algorithms.

FIG. 5 is a flowchart of an example arrangement of operations for a method of performing principal component analysis.

Like reference symbols in the various drawings indicate like elements.

DETAILED DESCRIPTION

Machine learning consists primarily of two domains: supervised learning and unsupervised learning. In unsupervised learning, there are three fundamental models that generally all machine learning platforms must support. These three models include k-means, matrix factorization, and principal component analysis. Principal component analysis (PCA) is the fundamental model used in dimensionality reduction. More specifically, PCA is an unsupervised statistical technique primarily used for dimensionality reduction in machine learning. This technique involves creating new uncorrelated variables that successively minimize variance. These variables are commonly referred to as principal components which are often used as features for machine learning models. However, conventional PCA libraries only support PCA training for small datasets that can entirely fit into memory of a single machine. This prevents training against large datasets, which is becoming increasingly important with the advent of "big data." This is especially true for cloud customers who wish to leverage huge datasets stored in distributed "data warehouses."

Implementations herein are directed toward a PCA controller that offers large-scale dimensionality reduction for mixed numerical and categorical features. In some implementations the PCA controller is configured for PCA model selection and PCA model training using, for example, distributed computing systems (e.g., "cloud" database systems). The controller allows the use of extremely large datasets that include a near unlimited number of rows and hundreds of thousands of features. The PCA controller may include a Structured Query Language (SQL) implementation inside a cloud-based database system. In some implementations, the PCA controller implements two or more PCA algorithms, such as a standard PCA algorithm and a randomized PCA algorithm. The PCA controller may include a strategy for automatically selecting one of the PCA algorithms based on one or more properties of input data.

In some implementations, the PCA controller implements a randomized PCA algorithm that is transposed to improve scalability. The randomized PCA algorithm may include an economy-sized QR decomposition algorithm to alleviate memory constraints in distributed computing environments. Optionally, the PCA controller includes a quadratic programming with non-decreasing constraints algorithm to estimate variance of each principal component when using randomized PCA.

The PCA controller may implement a user interface to allow a user to interact in various ways with the results beyond dimensionality reduction. For example, the user chains the data transformation results to training processes for other models to improve prediction accuracy for the other models.

Figure 1:
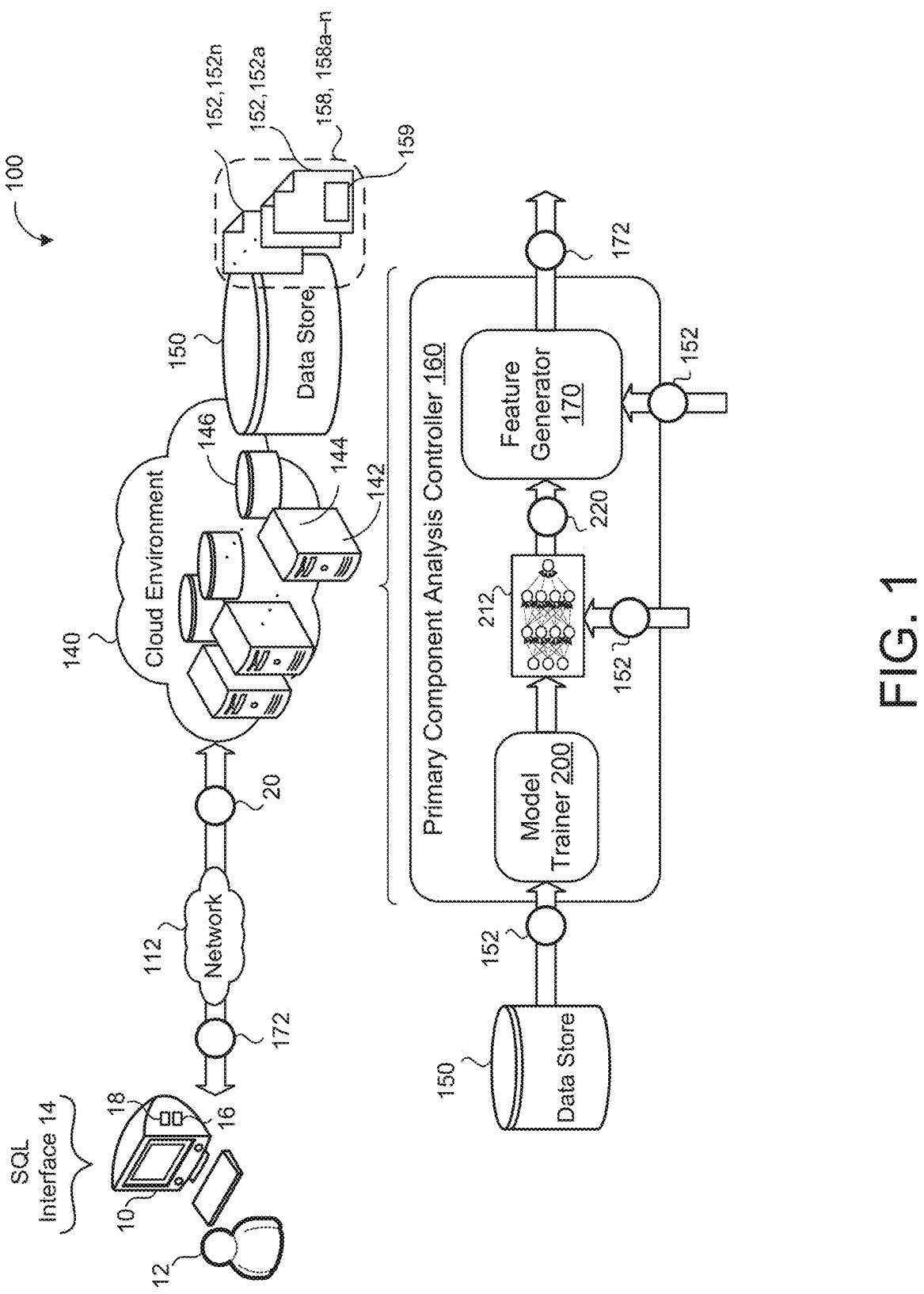
FIG. 1 is a schematic view of an example system for performing principal component analysis.

Referring now to FIG. 1, in some implementations, an example principal component analysis system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks 152, 152a-n within one or more datasets 158, 158a-n (e.g., tables stored in a cloud database). The data store 150 may store any number of datasets 158 at any point in time.

The remote system 140 is configured to receive a principal component analysis (PCA) request 20 from a user device 10 associated with a respective user 12 (e.g., a cloud customer) via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the request 20 using a Structured Query Language (SQL) interface 14. In this case, the request 20 may take the form of an SQL query. Each PCA request 20 requests the remote system 140 to perform PCA on one or more of the datasets 158.

The remote system 140 executes a PCA controller 160. The PCA controller 160 receives the PCA request 20 requesting the PCA controller 160 to perform PCA on one or more datasets 158 (e.g., tables or other data structures). The request 20 may include a reference to a specific dataset 158 stored at the data store 150. Alternatively, the request 20 includes the dataset 158. The dataset 158 includes multiple input features 159. Each input feature 159 represents an individual measurable property or characteristic of the dataset 158. In some examples, each dataset 158 is a table with multiple rows and multiple columns where each column represents an input feature 159 for each respective row of the table. For example, a dataset 158 that includes employee profiles may include a column (i.e., an input feature 159) for age, a column (i.e., another input feature 159) for gender, and a third column (i.e., a third input feature 159) for work location. Features may also be referred to as variables or attributes. Each data block 152 may represent a value associated with a column/row pair (e.g., a data block 152 in a row associated with employee "John" and column associated with age has a value of "40").

The PCA controller 160 includes a model trainer 200. Each time the model trainer 200 receives a request 20, the model trainer 200 obtains the corresponding dataset 158 to train a PCA model 212. The model trainer 200 may obtain the dataset 158 from the data store 150, the user device 10 (e.g., via the request 20), or via any other source. In some examples, the request 20 includes or references multiple datasets 158, and the model trainer 200 trains an independent model 212 for each corresponding dataset 158. The model trainer 200 trains the PCA model 212 on the raw input features 159 of the dataset 158. The model trainer 200 may train the PCA model 212 by obtaining eigenvectors via, for example, eigen decomposition of the covariance matrix of the dataset 158 or via singular value decomposition (SVD) on the dataset 158.

The trained model 212 determines one or more principal components 220 of the input dataset 158. Each principal component 220 is a unit vector that captures a portion of the variance within the dataset 158. The model 212 may generate a predetermined number of principal components 220. For example, the user 12 provides (e.g., via the request 20) the number of principal components 220 to generate or determine or the PCA controller 160 determines the number based on a size of the dataset 158 or any other parameter. In some implementations, the PCA model 212 generates a number of principal components 220 that satisfy a threshold percentage of the variance of the dataset 158. For example, the user 12 or PCA controller 160 sets a threshold of 90% and the model 212 will generate sufficient principal components 220 such that the cumulative percentage of the variance explained by the generated PCA components satisfies (e.g., exceeds) 90%.

The PCA controller 160 also includes a feature generator 170. The feature generator 170 receives the principal components 220 from the model 212 and generates a corresponding number of embedded features 172 representative of the dataset 158. In some examples, the feature generator 170 projects the raw input features 159 onto the generated principal components 220 to generate or determine the embedded features 172. The number or quantity of embedded features 172 may be less than the number or quantity of input features 159, as the embedded features 172 represent lower-dimensional data that preserves at least a portion of the variation of the dataset 158. The PCA controller 160 provides the embedded features 172 to the user 12 (e.g., via the user device 10). As described in more detail below, the user 12 uses the embedded features 172 to, for example, simplify or improve the training of another model by training the other model on the embedded features 172 instead of or in addition to the raw input features 159.

Figure 2:
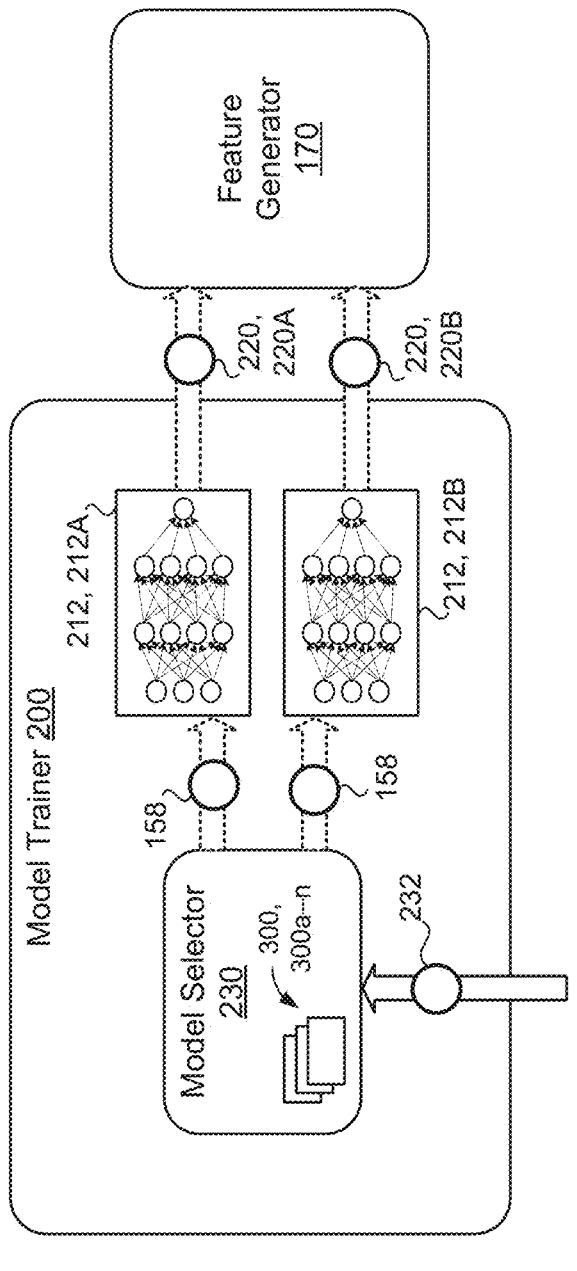
FIG. 2 is a schematic view of exemplary components of the system of FIG. 1.

Referring now to FIG. 2, in some implementations, the model trainer 200 includes a model selector 230. The model selector may select a PCA variant 300, 300a-n from among multiple PCA variants 300 and train the PCA model 212 on the input features 159 based on the selected PCA variant 300. For example, a first PCA variant 300 is a basic PCA variant (FIG. 3A) that is accurate but requires that the entire dataset 158 be able to fit within the memory of a single server that implements the remote system 140 while a second PCA variant 300 is a randomized PCA variant (FIGS. 3B and 3C) that, while less accurate than basic PCA variant, is scalable across multiple machines to support very large datasets.

Here, the model selector 230, based on selection criteria 232, selects whether to train the model 212 with a first PCA variant 300 (e.g., basic PCA) or a second PCA variant 300 (e.g., randomized PCA). When the model selector 230 selects the first variant 300, the training results in a first trained model 212, 212A and when the model selector 230 selects the second variant 300, the training results in a second trained model 212, 212B. The feature generator 170 thus receives principal components 220, 220A generated by the model 212A or principal components 220, 220B generated by the model 212B depending upon the variant selected by the model selector 230.

The model selector 230 may receive the selection criteria 232 from a number of different sources. In some examples, the selection criteria 232 includes a selection indication from the user 12 and the model trainer 200 selects the PCA variant 300, at least in part, based on the selection indication from the user 12. For instance, the user may request the model selector 230 select a specific PCA variant 300. Additionally or alternatively, the selection criteria 232 includes one or more parameters of the input dataset 158 and the model selector 230 automatically selects an appropriate PCA variant 300 based on the parameters. In some examples, the parameters include a number of input features 159 in the dataset 158. When the number of input features 159 satisfies a threshold, the model selector 230 may select the first PCA variant 300 and when the number of input features 159 fails to satisfy the threshold, the model selector 230 may select the second PCA variant 300. For example, when the dataset 158 includes a large number of input features 159, the model selector 230 selects a randomized PCA variant 300. In contrast, when the dataset 158 includes a relatively smaller number of features, the model selector 230 may select a basic PCA variant 300. The threshold may be based on a memory capacity of available servers or other computing devices of the remote system 140.

Referring now to FIGS. 3A-3C, algorithms for different exemplary PCA variants 300a-c are included. A PCA variant 300a (FIG. 3A) includes a basic PCA algorithm that includes computing the covariance matrix of the input dataset 158, computing the eigenvectors and eigenvalues, and choosing eigenvectors with the largest eigenvalues to form a projection matrix. The basic PCA algorithm may be more accurate than other PCA variants 300, but may require a dataset 158 small enough to fit within the memory of a single server. That is, the basic PCA algorithm may not have sufficient scalability to adequately handle large datasets 158. In some implementations, a basic PCA algorithm, like variant 300a, is selected when a dataset 158 has a number of input features 159 below a threshold value, indicating that the dataset 158 is appropriate (e.g., small enough) for the basic PCA algorithm.

A randomized PCA variant 300b (i.e., rPCA) exemplified in FIG. 3B allows for the PCA controller 160 to perform low-rank matrix approximation in order to exploit modern computational architectures more fully than the basic PCA algorithm (i.e., variant 300a). The randomized PCA variant may use random sampling to identify a subspace that captures a majority of the action of a matrix. The input matrix may be compressed to this subspace and the reduced matrix may be manipulated deterministically to obtain a desired low-rank factorization. The low-rank matrix approximations may be performed using QR decomposition, truncated SVD, and the like. The variant 300*b* may be applied to a matrix of size m×n, where m is the number of rows and n is the feature dimensionality. The rPCA variant 300*b* may be able to process a matrix where the number of rows, m, is in a defined range (e.g., 100,000 to 1,000,000). In practice, it may be easier to limit the number of columns (i.e., the feature dimensionality) than the number of rows. Accordingly, it may be preferable to transpose processing of the matrix.

In some implementations, the model selector 230 selects a transposed randomized PCA variant 300*c* (FIG. 3C). While in the randomized PCA variant 300*b* of FIG. 3B, the Gaussian random matrix Ω is multiplied on the right side of A, the transposed PCA variant 300*c* of FIG. 3C applies the Gaussian random projection on the left side of the input matrix A. Accordingly, the number of rows in a matrix that can be processed by the variant 300*c* may be unlimited, while the columns in the matrix may be limited (e.g., under 1,000,000 columns). With the randomized PCA variant 300*b*, the PCA controller 160 may be required to perform QR decomposition of AΩ in memory, which may limit the number of rows or data samples the dataset 158 includes. In contrast, the transposed randomized PCA variant 300*c* instead limits the feature dimensionality (e.g., the number of columns) instead of the number of rows. Thus, based on the dataset 158, the model selector 230 may select the randomized PCA variant 300*b* (e.g., when the dataset 158 includes a large number of rows) or the transposed randomized PCA variant 300*c* (e.g., when the dataset 158 includes a large number of input features 159). While examples herein include three different PCA variants 300, the model selector 230 may select from any number of PCA variants 300 such as incremental PCA, multiple correspondence analysis (MCA), mixed PCA and MCA, etc.

Figure 4A:
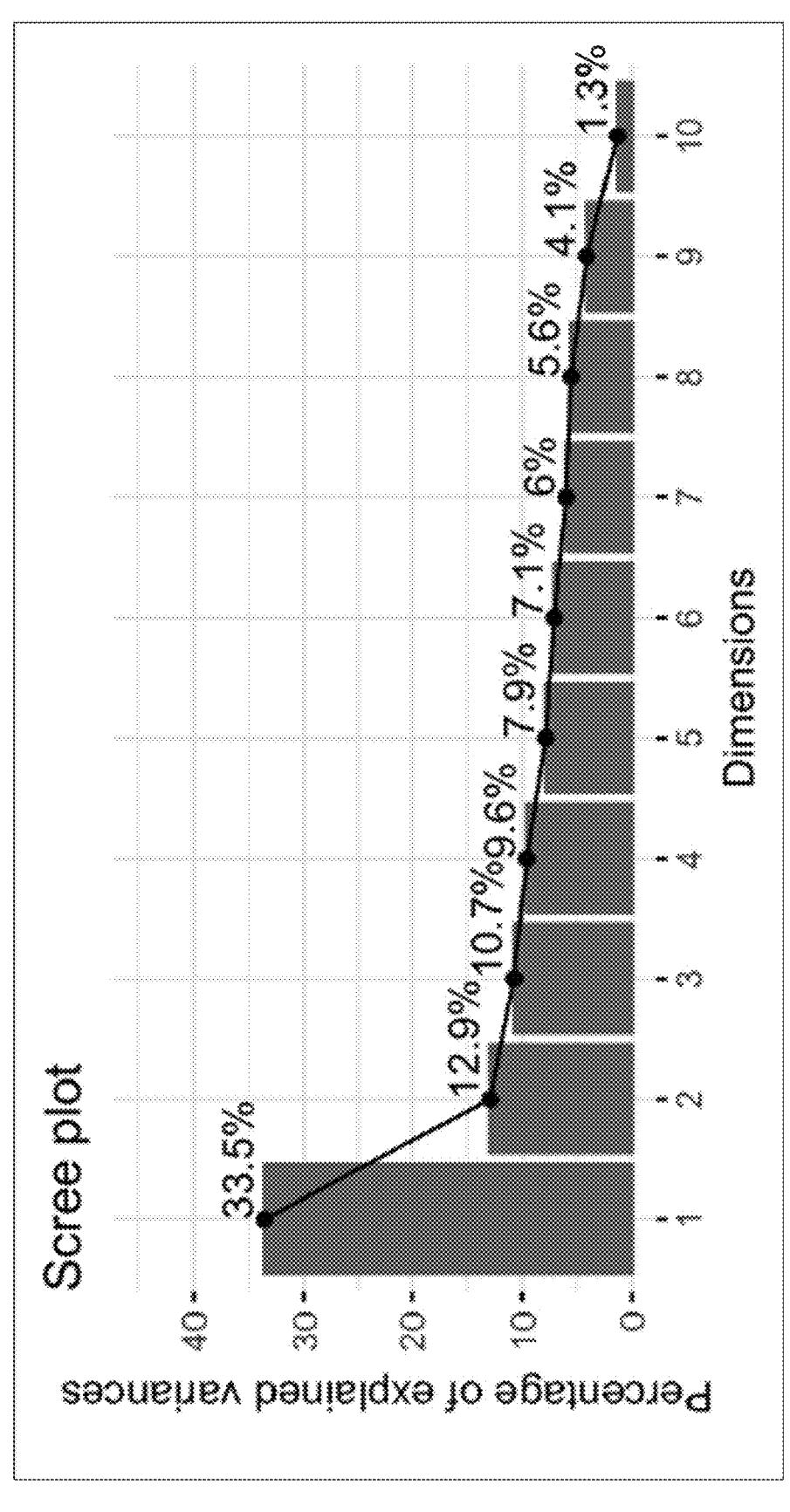
FIGS. 4A and 4B are schematic views of exemplary plots generated by the system of FIG. 1.
Figure 4B:
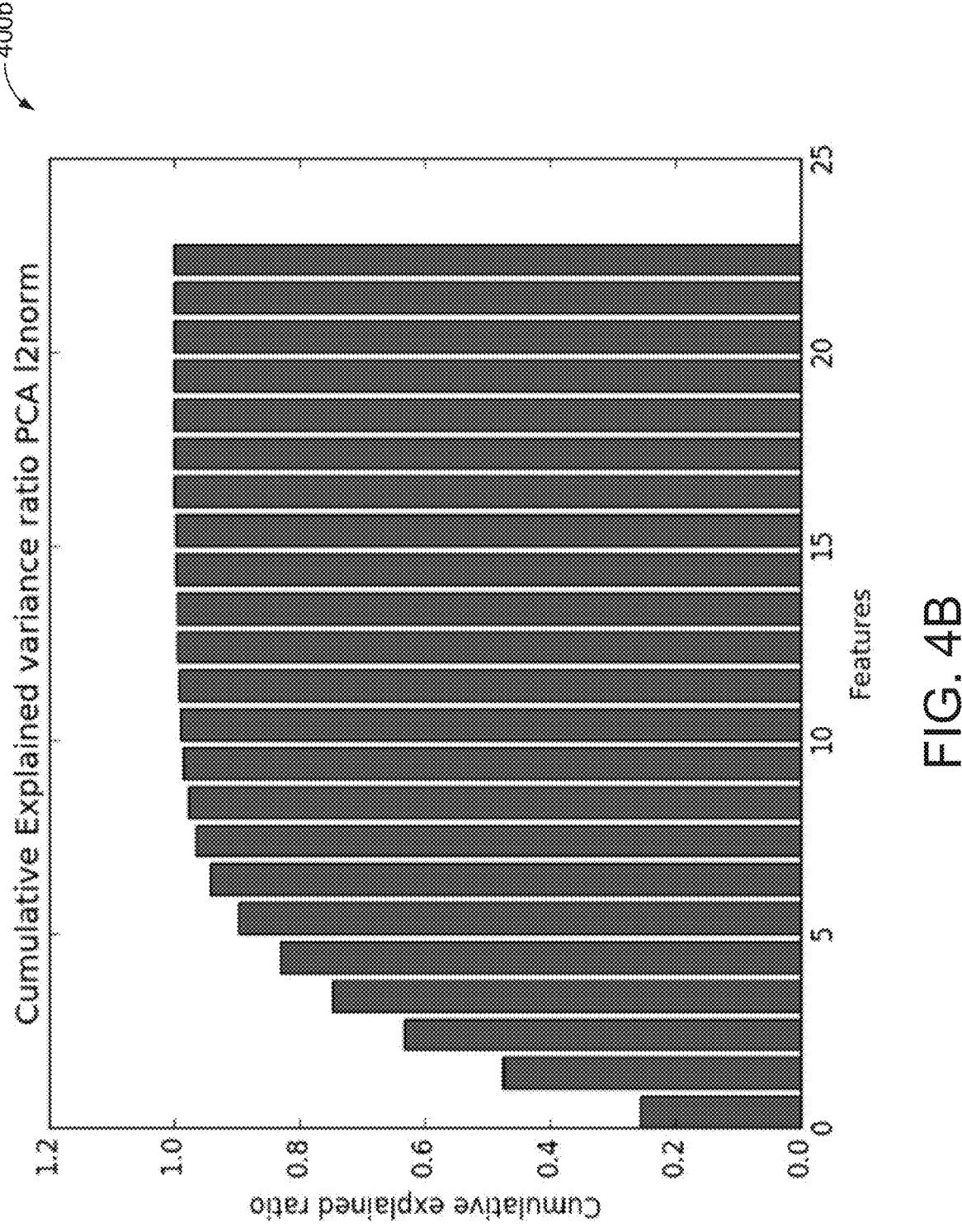

Referring now to FIGS. 4A and 4B, in some implementations, the PCA controller 160 includes user interface (UI) support. For example, the PCA controller 160 returns the embedded features 172 and instructions that cause the user device 10 to display results on a graphical user interface (GUI) executed by the user device 10. In some examples, the instructions cause the user device 10 to display one or more plots, graphs, or other graphical representations of parameters of the embedded features 172 (i.e., the results of dimensionality reduction through PCA algorithms). A plot 400*a* (FIG. 4A) includes a scree plot which is a line plot of the eigenvalues of factors or principal components (i.e., the embedded features 172) from a request 20. The scree plot may be used to determine the number of factors to retain in a principal component analysis. Here, the x-axis represents an identification for principal components 220 (i.e., an ID 1-10 of ten principal components 220) and the y-axis represents an explained variance ratio. Here, the first principal component 220 (i.e., "1") makes up 33.5% of the explained variance ratio while a second principal component 220 (i.e., "2") makes up 12.9% of the explained variance ratio. The user 12 or the PCA controller 160 may opt to retain a number of principal components 220 (and thus embedded features 172) based on a cumulative total of the explained variance ratio. That is, the number of retained principal components 220 and/or embedded features 172 may be based on a threshold value associated with the cumulative total of the principal components 220. Here, the cumulative total of the ten principal components is 98.7%. When the threshold is, for example, 90%, the PCA controller 160 elects to only retain the first eight principal components

220 (with a cumulative total of 93.3%) and not retain the ninth and tenth principal components 220.

A plot 400*b* of FIG. 4B illustrates an alternative view of the cumulative explained variance ratio. Here, a cumulative explained variance ratio plot includes the embedded features 172 as the x-axis and the cumulative explained ratio as the y-axis. The plot 400*b* makes it apparent the diminishing returns as the number of embedded features 172 increases. The PCA controller 160 may instruct the GUI of the user device 10 to display any number of other plots or graphs illustrating the principal components 220 and/or the embedded features 172. For example, the PCA controller 160 provides instructions for a projection plot that projects visual data points in a new space spanned by selected principal components.

The above example interfaces are not intended to be limiting, and any appropriate user interface can be generated to display the results of the dimensionality reduction through PCA algorithms. Further, the transformation results (i.e., embedded features 172) of the dataset 158 may also be used by one or more models for further processing. For example, a supervised learning model may have greater prediction accuracy using embedded features 172 instead of the original dataset 158 due to the reduced dimensionality. In some examples, the PCA controller 160 facilitates "chaining" the embedded features 172 determined by the PCA controller 160 into other models. That is, in some examples, the PCA controller 160 uses the embedded features 172 and a label from the dataset 158 to train another model (e.g., a logistic regression model). Optionally, the PCA controller 160 generates one or more new columns for labeling the embedded features 172. For example, a column is devoted to identifying or classifying each row of the embedded features 172. The PCA controller 160 may include a "pass through" feature to pass through the new columns to a subsequent supervised learning model.

FIG. 5 is a flowchart of exemplary arrangement of operations for a method 500 for performing primary component analysis. The method 500, at operation 502, includes receiving a PCA request 20 from a user 12 requesting the data processing hardware 144 to perform PCA on a dataset 158 that includes a plurality of input features 159. At step 504, the method 500 includes training a PCA model 212 on the plurality of input features 159 of the dataset 158. At step 506, the method 500 includes determining, using the trained PCA model 212, one or more principal components 220 of the dataset 158. The method 500, at step 508, includes generating, based on the plurality of input features 159 and the one or more principal components 220, one or more embedded features 172 of the dataset 158. At step 510, the method 500 includes returning the one or more embedded features 172 to the user 12.

Figure 6:
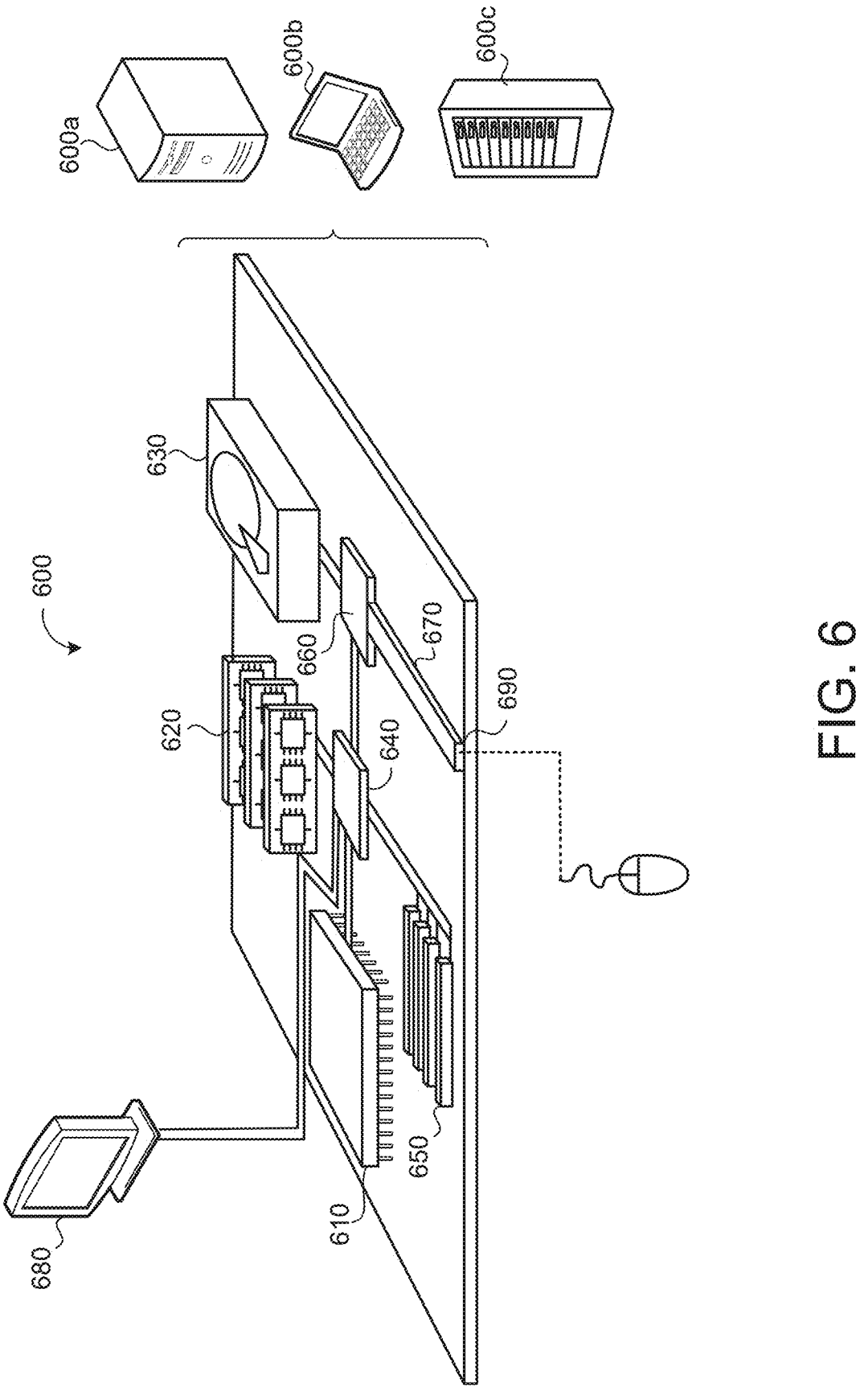
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/ controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a,* as a laptop computer 600*b,* or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by data processing hardware, a principal component analysis request from a user requesting the data processing hardware to perform principal component analysis on a dataset, the dataset comprising a plurality of input features;
determining, by the data processing hardware, whether a number of the plurality of input features satisfies a threshold number of input features, wherein the threshold number of input features corresponds to a number of the input features that fit into a memory of a single server that implements the data processing hardware;
responsive to determining that the number of the plurality of input features satisfies the threshold number of input features, selecting, by the data processing hardware, a basic principal component analysis variant as a selected principal component analysis variant;
responsive to determining that the number of the plurality of input features fails to satisfy the threshold number of input features, selecting, by the data processing hardware, a randomized principal component analysis variant as the selected principal component analysis variant;
training, by the data processing hardware and using the selected principal component analysis variant, a principal component analysis model on the plurality of input features of the dataset;
determining, by the data processing hardware and using the trained principal component analysis model, one or more principal components of the dataset;
generating, by the data processing hardware and based on the plurality of input features and the one or more principal components, one or more embedded features of the dataset; and
returning, by the data processing hardware, the one or more embedded features to the user.

2. The method of claim 1, wherein a number of the one or more embedded features of the dataset is less than a number of the plurality of input features of the dataset.

3. The method of claim 1, wherein the principal component analysis request comprises a single Structured Query Language query.

4. The method of claim 1, wherein determining, using the trained principal component analysis model, the one or more principal components of the dataset comprises using an economy sized quadrature remainder decomposition algorithm.

5. The method of claim 1, wherein determining, using the trained principal component analysis model, the one or more principal components of the dataset comprises determining, by the data processing hardware and using a quadratic programming with non-decreasing constraints algorithm, the one or more principal components of the dataset.

6. The method of claim 1, wherein the randomized principal component analysis variant is configured to process a matrix having a number of rows in a defined range of 100,000 to 1,000,000.

7. The method of claim 1, wherein the randomized principal component analysis variant is a transposed randomized principal component analysis algorithm.

8. A system comprising:
data processing hardware; and
memory hardware in communication with the data processing hardware, the memory hardware storing instructions that when executed on the data processing hardware cause the data processing hardware to:
receive a principal component analysis request from a user requesting the data processing hardware to perform principal component analysis on a dataset, the dataset comprising a plurality of input features;
determine whether a number of the plurality of input features satisfies a threshold number of input features, wherein the threshold number of input features corresponds to a number of the input features that fit into a memory of a single server that implements the data processing hardware;
responsive to determining that the number of the plurality of input features satisfies the threshold number of input features, select a basic principal component analysis variant as a selected principal component analysis variant;
responsive to determining that the number of the plurality of input features fails to satisfy the threshold number of input features, select a randomized principal component analysis variant as the selected principal component analysis variant;
train, using the selected principal component analysis variant, a principal component analysis model on the plurality of input features of the dataset;
determine, using the trained principal component analysis model, one or more principal components of the dataset;
generate, based on the plurality of input features and the one or more principal components, one or more embedded features of the dataset; and
return the one or more embedded features to the user.

9. The system of claim 8, wherein a number of the one or more embedded features of the dataset is less than a number of the plurality of input features of the dataset.

10. The system of claim 8, wherein the principal component analysis request comprises a single Structured Query Language query.

11. The system of claim 8, wherein the instructions cause the data processing hardware to determine the one or more principal components of the dataset using an economy sized quadrature remainder decomposition algorithm.

12. The system of claim 8, wherein the instructions cause the data processing hardware to determine the one or more principal components of the dataset using a quadratic programming with non-decreasing constraints algorithm.

13. The system of claim 8, wherein the randomized principal component analysis variant is configured to process a matrix having a number of rows in a defined range of 100,000 to 1,000,000.

14. The system of claim 8, wherein the randomized principal component analysis variant is a transposed randomized principal component analysis algorithm.

* * * * *